United States Patent [19]

Angott

[11] 4,041,325
[45] Aug. 9, 1977

[54] THERMOSTAT TIMER

[75] Inventor: Paul G. Angott, Troy, Mich.

[73] Assignee: Thermotrol Corporation, Madison Heights, Mich.

[21] Appl. No.: 675,719

[22] Filed: Apr. 12, 1976

Related U.S. Application Data

[63] Continuation-in-part of Ser. No. 586,069, June 11, 1975, abandoned.

[51] Int. Cl.² ............... F16H 5/76; G05D 23/00; H01H 73/10
[52] U.S. Cl. ............................. 307/141; 58/39.5; 58/152 R; 200/35 R; 200/38 FB; 236/46 R; 318/281; 318/285; 337/302
[58] Field of Search .......... 58/21.13, 21.15, 39.5, 58/152 R; 74/3.54; 119/51.11; 137/624.15, 624.16, 624.17, 624.2; 236/46 R, 46 E; 307/141; 318/281, 285, 265, 266, 267; 200/35 R, 38 A, 38 DA, 38 E, 38 FB, 38 D; 337/302, 303, 304, 305; 219/492

[56] References Cited

U.S. PATENT DOCUMENTS

| 8,754 | 6/1879 | Herzberg | 137/624.17 |
| 1,228,757 | 6/1917 | Denison | 337/303 |
| 1,520,496 | 12/1924 | Heinz | 337/304 |
| 1,789,057 | 1/1931 | Vickery | 200/38 DA |
| 2,345,594 | 4/1944 | Gardner | 318/266 X |
| 2,538,413 | 1/1951 | Chard | 119/51.11 X |
| 3,178,947 | 4/1965 | Keefe | 200/38 D X |
| 3,179,758 | 4/1965 | Trock | 200/38 D |
| 3,985,982 | 10/1976 | Schneidinger | 200/38 A X |

Primary Examiner—Allan D. Herrmann
Attorney, Agent, or Firm—McGlynn and Milton

[57] ABSTRACT

An add-on device for automatically adjusting the setting of a control mechanism, such as, a thermostat, which includes a separate, independent timer which is mounted adjacent the existing control mechanism and controls the same by means of a mechanically driven member which engages the manual adjuster of the control mechanism; the device further including a suitable coupler for coupling the driven member to the timer for moving the driven member at selected times to change the position of the adjuster.

48 Claims, 11 Drawing Figures

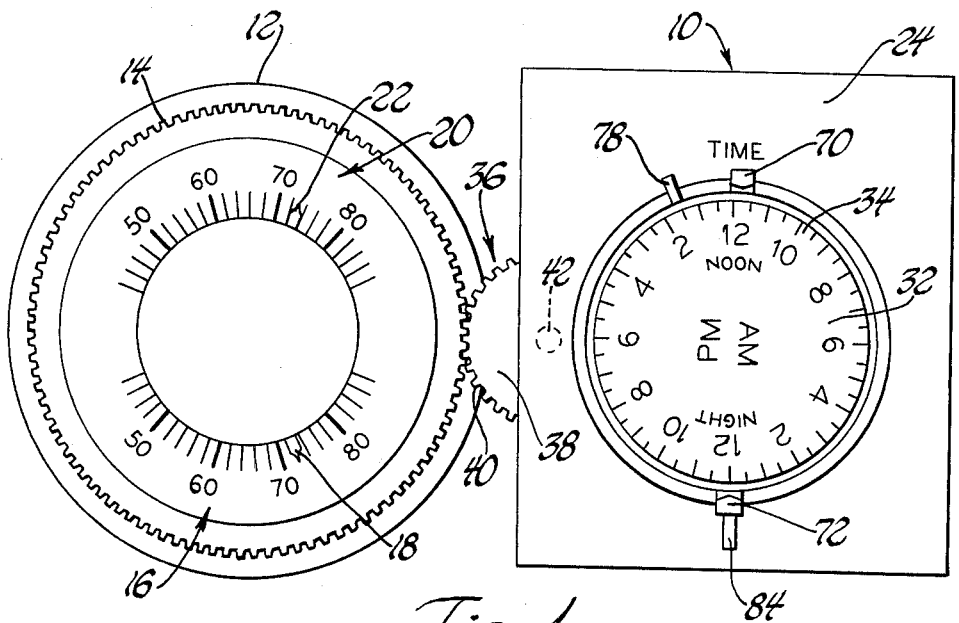
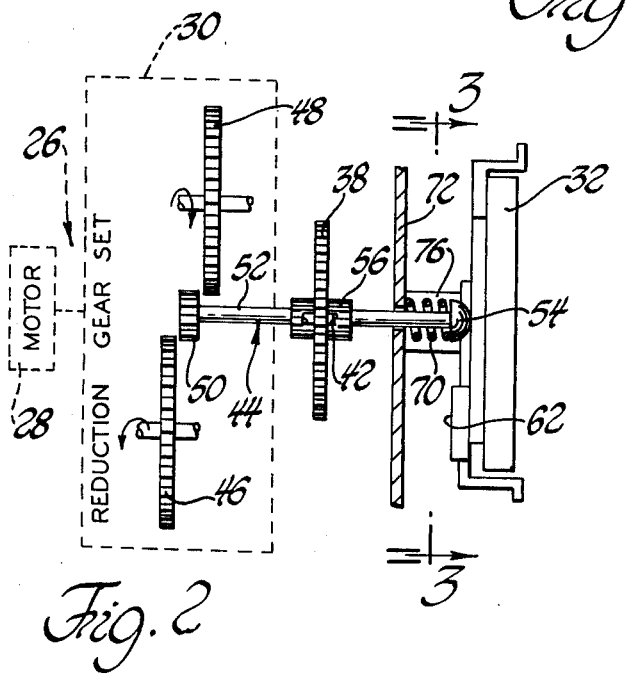
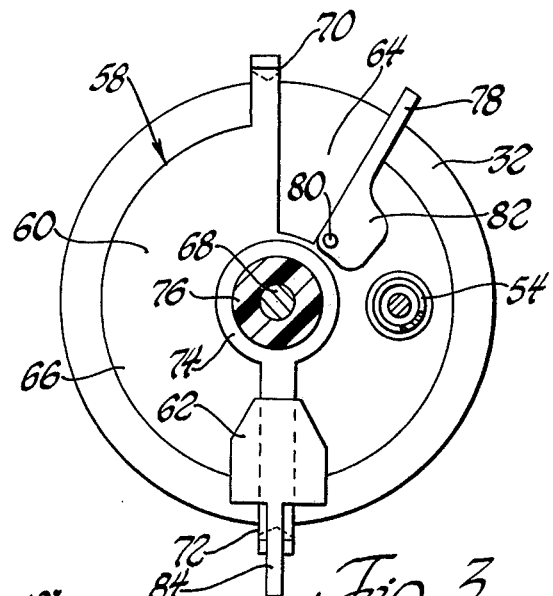
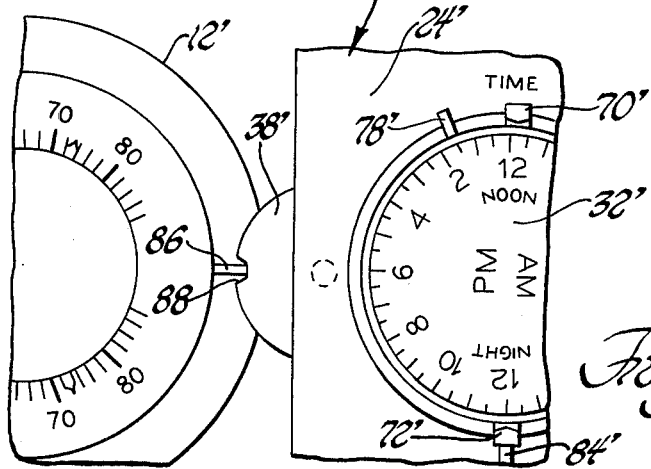
Fig. 1
Fig. 2
Fig. 3
Fig. 4

THERMOSTAT TIMER

This is a continuation-in-part of U.S. patent application Ser. No. 586,069 filed June 11, 1975 now abandoned.

This invention relates to a device for automatically adjusting the temperature setting of an externally adjustable thermostat.

It is evident that, in view of the current fuel crisis, measures must be taken to conserve energy. One method of conserving energy which has been widely publicized is to reduce the temperature setting of thermostatically controlled heating systems during those times of the day in which they are not needed. An example of this is to reduce the temperature setting of the furnace in a residential home during the night when warmer temperatures are not necessary.

Although the efficacy of this method of conserving energy is not denied, many persons fail to comply with this practice simply out of forgetfulness. Additionally, there is some inconvenience involved since it takes time for the heating system to raise the temperature to a comfortable level after the period during which it has been lowered. Therefore, some people may be reluctant to reduce the temperature setting of their thermostats because they do not care to get up to a cold house in the morning or to return to one in the evening after work. In order to promote this energy-conserving practice by remedying these problems to thereby increase the likelihood that thermostats will be turned down, automatic thermostat control devices have been developed. Such devices may be set to automatically reduce the temperature setting of the thermostat at selected times of the day and also to automatically raise the temperature settings at other times.

Most of these automatic thermostat control devices are incorporated into the thermostat itself. That is, the thermostat and the automatic timer control make up a single unit. Therefore, in order to employ one of these devices, it is necessary to replace the existing thermostat with a new automatic thermostat. Not only are the automatic thermostats quite expensive, but also, installation costs are high since a skilled technician is needed to do the installation job. Therefore, the expense involved is prohibitive for many persons and simply deters many others from purchasing one of these devices. It would be more conducive to this energy conservation practice if a relatively inexpensive thermostat timer device of uncomplicated design could be purchased by individuals and installed by them to automatically control their existing thermostats. In other words, a thermostat timer of the "add-on" variety would be much more economically attractive and thereby induce wider use of such devices. An automatic thermostat control which generally fits into this category is the device disclosed in U.S. Pat. No. 3,834,618 issued Feb. 11, 1974. The device disclosed therein comprises a timed heating unit which is mounted below an existing thermostat and which, in effect, creates an artificial condition by heating the air surrounding the thermostat which causes the thermostat to shut off the furnace. As will be seen, the structure and function of this device differs markedly from that of the instant invention in that the instant invention comprises an add-on thermostat timer which is directly mechanically coupled to an existing thermostat.

In accordance with the foregoing, the instant invention consists of a device for automatically adjusting the temperature setting of an externally adjustable thermostat which may be mounted adjacent an existing thermostat. In other words, the thermostat timer of the instant invention is of the add-on variety. More specifically, the device includes a timer adapted for mounting adjacent a thermostat. The timer is connected to the adjustable setting dial or lever of the thermostat by means of a mechanically driven member, such as, an output wheel. A coupler mechanism is provided which couples the mechanically driven member to the timer for driving the member at selected time intervals. The timer may be set to activate the coupler mechanism at any desired time of the day. Additionally, the coupler mechanism is capable of moving the output wheel in a first direction to "dial down", or lower, the temperature setting of the thermostat and also of moving the output wheel in a second direction to "dial up", or raise, the temperature setting of the thermostat. The duration of activation of the coupler mechanism can also be controlled to vary the extent of the change in the temperature setting. By way of example, the thermostat time may be set to begin lowering the temperature setting of the thermostat 10° at ten o'clock (10:00) p.m. If the temperature had been set at 72°, during a major portion of the night the temperature will be 62°. The thermostat timer may also be set to begin raising the temperature setting 10° at five o'clock (5:00) a.m. Therefore, the room temperature will begin to increase toward the normal 72° level. In this manner, the thermostat is automatically lowered and raised so that it is unnecessary to remember to lower the setting or to wait for the temperature to increase in the morning. Additional controls may also be added for controlling the temperature during the day when a home may be vacant.

It is, of course, to be recognized that the device of the instant invention may be employed in other environments than thermostats for heating systems. The device is applicable to any type of control mechanism which includes an externally accessible adjuster for adjusting the same, such as, by a dial or lever, and which requires periodic adjustment at various times of the day.

Other advantages of the instant invention will be readily appreciated as the same becomes better understood by reference to the following detailed description when considered in connection with the accompanying drawings wherein:

FIG. 1 is a front-elevational view of a preferred embodiment of a thermostat timer constructed in accordance with the instant invention which is mounted in operative engagement with a thermostat;

FIG. 2 is a schematic illustration of a mechanism suitable for operating the thermostat timer;

FIG. 3 is a view taken generally along line 3—3 of FIG. 2;

FIG. 4 is a fragmented, front-elevational view, similar to FIG. 1, showing an alternate embodiment of the instant invention;

Figure 5:
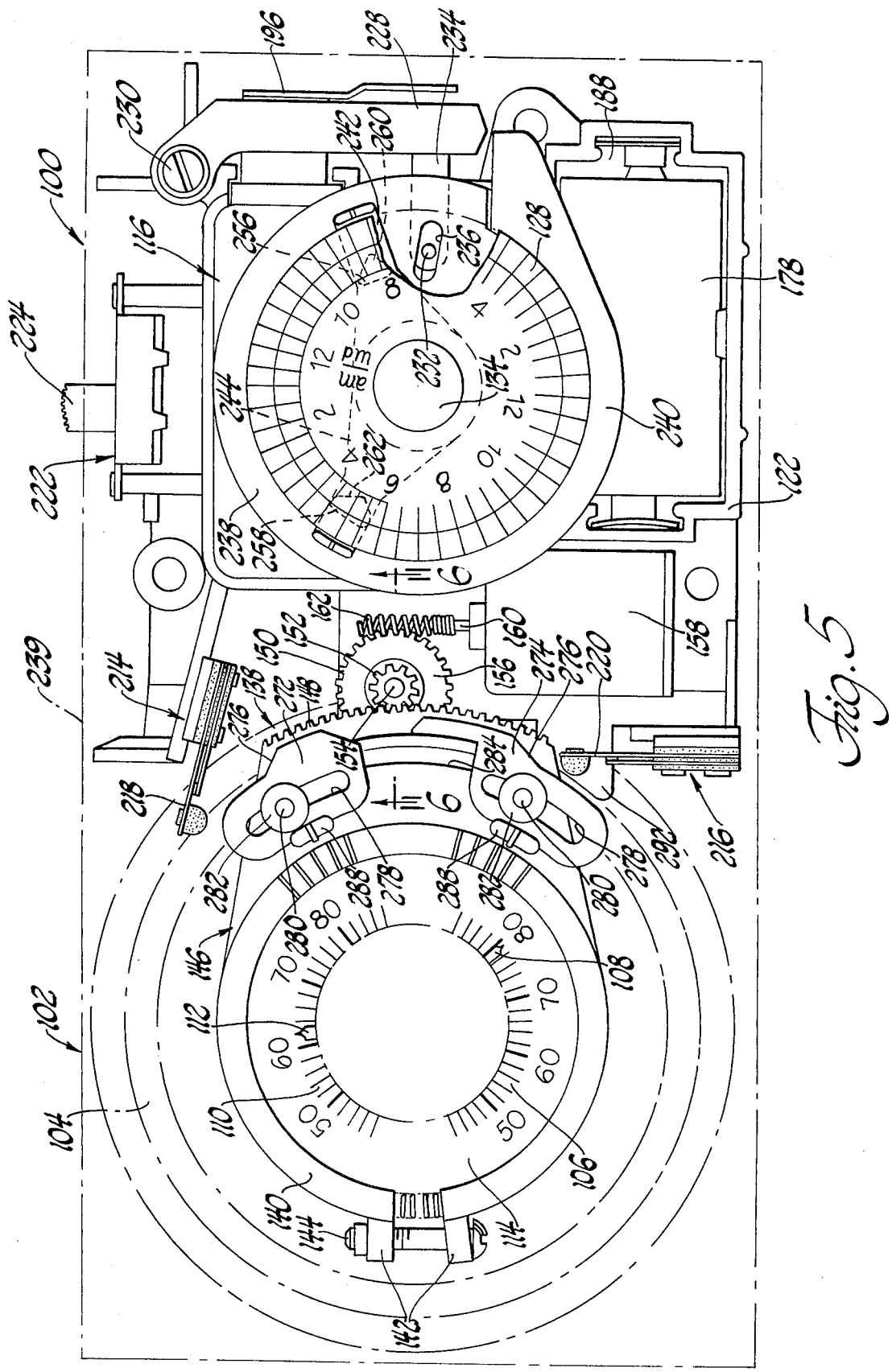
FIG. 5 is a plan view of another embodiment of a thermostat timer constructed in accordance with the instant invention which is shown in operative engagement with a thermostat.

Referring more particularly to the drawings, a thermostat timer constructed in accordance with the instant invention is generally shown at 10 in FIG. 1. The device is designed to automatically adjust the temperature setting of an externally adjustable thermostat 12. As used herein, "externally adjustable" means that the thermostat includes some type of exposed movable member, such as, the serrated, or toothed, dial 14 which is rotatably movable to change the temperature setting of the thermostat.

The thermostat 12 shown in FIG. 1 is of a standard variety and includes a lower temperature scale, generally indicated at 16, and a needle 18 for indicating the actual temperature of the surrounding environment. An upper temperature scale, generally indicated at 20, is also provided and includes an indicating needle 22. The needle 22 indicates the temperature setting of the thermostat. The position of this needle 22 may be adjusted by rotating the dial 14 to vary the temperature setting. Since thermostats are common and well-known devices it is unnecessary to describe in any detail their internal workings. Suffice it to say, however, that such devices are employed to control heating and air-conditioning systems to maintain the temperature of the surrounding environment at the temperature indicated.

A major feature of the instant invention is that it consists of an add-on device which may be conveniently installed adjacent the thermostat 12 for automatically adjusting the temperature setting of the thermostat 12 at selected times of the day. In accordance with the foregoing, the thermostat timer device 10 consists of a self-contained unit enclosed in a housing 24. The housing 24 is provided with suitable means (not shown) for mounting the same to a wall adjacent to the thermostat 12. Any suitable fastening means may be employed, the only requirement being that, in some cases, it may be necessary to vary the distance between the supporting wall and the rear of the housing 24 to accommodate different size thermostats. Since this can easily be accomplished by shims, adjustable jack-like legs, or other well-known ways, a specific arrangement is not shown.

The housing encloses timing means, a schematic of which is generally shown at 26 in FIG. 2. The timing means is of standard design, that is, it includes a suitable clockwork mechanism for measuring time. A simple and inexpensive clockwork mechanism, which is suitable for use in the thermostat timer 10, includes a small motor 28 which drives a reduction gear set 30. The motor 28 is preferably a small electric motor. The electric motor 28 may derive power from a regular 110 volt AC wall receptacle, in which case an electric cord is provided. Alternatively, the motor 28 may be wired into the electric power source of the thermostat itself. The motor 28 drives a reduction gear set 30 which is in turn connected through a shaft 68 to a time indicator 32 which is in the shape of a dial. The reduction gear set 30 reduces the output of the motor 28 so that the time indicator dial 32 rotates once during a fixed time span. For the purpose of a thermostat timer, it is convenient that the time indicator dial 32 rotate once per day, that is, once in every 24 hours. The time indicator dial 32, therefore, includes suitable indicia 34 about its periphery indicating the incremental time periods over the fixed time span; specifically, the 24 hours of the day. As should be apparent, as the time indicator dial 32 rotates, the time of day can be determined by the position of the time indicator dial 32 with respect to a fixed point on the housing 24.

The thermostat timer 10 includes mechanically driven output means, generally shown at 36, for engaging the adjuster, i.e., the dial 14, of the thermostat 12. The output means 36 comprises an output wheel 38 having, in the embodiment shown in FIG. 1, gear teeth 40 which mesh with the teeth, or serrations, on the dial 14. Due to the meshing relationship, rotation of the output wheel 38 causes rotation of the dial 14 to effect a change in the temperature setting. The output wheel is mounted for rotatable movement on a shaft 42 which is suitably supported by the housing 24. The gear teeth 40 on the output wheel 38 are generally characterized as mechanical connecting means for mechanically connecting the output wheel to the dial 14 of the thermostat 12. Accordingly, direct physical engagement is established between the thermostat timer 10 and the thermostat 12. The mechanically driven output means is designed to bring the thermostat under the control of the timer without requiring major physical alterations to the thermostat. This enables any reasonably handy person to install the thermostat timer without the aid of a skilled technician, thus eliminating installation costs.

It is only necessary to drive the output wheel 38 when a temperature adjustment is required. Therefore, during a greater portion of the day the output wheel 38 remains idle. Coupler means, generally indicated at 44, is provided for coupling the output wheel 38 to the timing means 26 for driving the output wheel 38 at selected times. Since the temperature setting of the thermostat 12 must be raised, as well as lowered, the coupler means must be capable of driving the output wheel 38 in a first direction to lower the temperature setting of the thermostat 12 and also in a second direction to raise the temperature setting of the thermostat 12. Accordingly, the coupler means includes suitable drive means for carrying out this objective. As will be described in greater detail, the drive means consists of two oppositely rotating gears 46 and 48 of the reduction gear set 30 of the thermostat timer 10. In other words, since it is necessary to drive the output wheel 38 selectively in the clockwise or counterclockwise direction, a convenient way in which to accomplish this is to select two gears of the reduction gear set 30 which are rotating in opposite directions.

A suitable connection is provided for transferring the rotational movement of the reduction gears to the output wheel 38. For this purpose, the coupler means includes a pinion gear 50 and pilot means for guiding the movement of the pinion gear 50 from a neutral position (in which the output wheel 38 is idle) into engagement with either of the two oppositely rotating gear 46 and 48 of the reduction gear set 30. The pilot means includes a drive shaft 52 which carries the pinion gear 50 and is operatively connected to a cam follower 54. As will be seen, the cam follower 54 follows a cam surface on the rear of the rotating time indicator dial 32. The drive shaft 52 also includes an axially elongated drive gear 56 which continually engages the output wheel 38 regardless of the position of the pinion gear 50. It should be apparent that when the pinion gear 50 is moved into engagement with reduction gear 46, which is moving in a counterclockwise direction, the output wheel 38 will be driven by the drive gear 56 in a counterclockwise direction. Conversely, when the pinion gear 50 is moved into engagement with the clockwise rotating reduction gear 48, the drive gear 56 will drive the output wheel 38 in a clockwise direction.

Of course, the specific details of the coupler means have been selected in view of the type of clockwork mechanism employed. Other coupler means should be immediately apparent if other types of timing devices are employed, it only being necessary to provide some means for rotating the output wheel 38 at times of the day determined by the timer.

The timing means includes selector means generally indicated at 58 in operative engagement with the cam follower 54 of the coupler means 44 for setting the time, duration, and direction of movement of the output wheel 38. In other words, the selector means is capable of setting the time of day at which the pinion gear 50 will be moved from the neutral position into engagement with one of the reduction gears 46 and 48. The particular reduction gear 46 and 48 which is engaged by the pinion gear 50 will determine which direction, i.e., clockwise or counterclockwise, the output wheel 38 will rotate. This in turn determines whether the temperature setting of the thermostat 12 will be raised or lowered. The selector means also determines the duration of movement of the output wheel 38. It should be apparent that, everything else being equal, the longer the output wheel rotates, the greater will be the change in temperature setting. It should be remembered, however, that the two reduction gears 46 and 48 are not rotating at the same speed and this should also be taken into consideration.

In order to accomplish the foregoing, the selector means includes an adjustable cam surface 60 which is carried by, and movable with, the rotating time indicator dial 32. The cam surface 60 includes a number of zones which operate upon the cam follower 54 and thus determine the position of the pinion gear 50. There are three basic zones; a raised zone 62, a recessed zone 64, and an intermediate or neutral zone 66. As the time indicator dial 32 rotates upon its shaft 68 the various zones encounter the cam follower 54. A coil spring 69 is disposed between a wall 71 of the housing 24 and the cam follower 54 to maintain the cam follower 54 in constant engagement with the cam surface 60. As shown in FIG. 3, the cam follower 54 is in engagement with the neutral zone 66. Therefore, the pinion gear 50 is maintained in a neutral position between the reduction gears 46 and 48. As the time indicator dial 32 rotates, the raised zone 62 will be brought into engagement with the cam follower 54. When this occurs, the cam follower 54 moves the drive shaft 52 toward the left, as viewed in FIG. 2, and into engagement with the counterclockwise rotating reduction gear 46. The reduction gear 46 drives the pinion gear 50, the drive shaft 52, and the drive gear 56. The drive gear 56 rotates the output wheel 38 to turn the dial 14 of the thermostat 12 in a clockwise direction to raise the temperature setting. The reduction gear 46 will continue to drive the pinion gear 50 until the raised zone 62 passes beyond the cam follower 54. When this occurs, the cam follower 54 will be moved to the right by the spring 69 onto the intermediate or neutral zone 66 of the cam 60. This movement will disengage the pinion gear 50 from the reduction gear 46 and rotation of the output wheel 38 will cease.

When the time indicator dial 32 rotates sufficiently to bring the recessed zone 64 into contact with the cam follower 54, the cam follower 54 will move to the right as it enters the recessed zone 64. This movement brings the pinion gear 50 into engagement with the clockwise rotating reduction gear 48. The reduction gear 48, since it is rotating in a direction opposite to that of reduction gear 46, will cause the output wheel 38 to rotate in a direction to lower the temperature setting of the thermostat.

As noted above, the cam surface 60 normally rotates with the time indicator dial 32. In order to adjust the times of day at which setting changes will occur, selector members are provided. A dial-down selector member 70 is attached to the cam surface 60 for rotating the cam surface 60 with respect to the time indicator dial 32 to fix the time of day at which a reduction in the setting of the thermostat 12 will begin to be raised.

In order to vary the extent of setting change, the duration of movement of the output wheel 38 must be variable. To accomplish this, the widths of the raised and recessed zones 62 and 64 of the cam surface 60 are variable. A selector member 78 is pivotally secured to the cam surface 60 by means of a rivet 80. The selector member 78 carries a surface 82 which may be moved over the recessed zone 64 by pivoting the selector member 78. Reducing the width of the recessed zone 64 results in a reduction of the time during which the cam follower 54 is displaced to the right and, therefore, the time during which the pinion gear 59 is in engagement with the reduction gear 48. Accordingly, the output wheel 38 will be rotated for a shorter time and, therefore, a smaller change in the setting of the thermostat 12 will be achieved. It is contemplated that suitable graduations may be placed on the exposed end of the selector member 78 to indicate, in degrees, the amount of change which will occur in any given position of the selector member 78.

In similar manner, the width of the raised zone 62 is also made variable. This is accomplished by providing a wedge-shaped raised zone 62 which is movable in and out along the selector member 72. A selector member 84 is attached to the raised zone 62 for accomplishing movement thereof. The selector member 84 also includes graduations to indicate the extent of change in the temperature setting which will occur in any given position of the raised zone 62. It should be remembered that the selector members 78 and 84 should be set so that an equal setting change will result. In other words, the thermostat should be raised the same number of degrees that it is lowered.

Since the two reduction gears 46 and 48 are not rotating at the same speed, the widths of the two zones to accomplish the same change in temperature setting will not be equal. In other words, the slower moving reduction gear will require a wider zone to effect the same temperature change as the faster moving reduction gear. It is, of course, a simple matter to correlate the speed of the reduction gears with the width of the zones to effect equal changes since the speed of the indicating dial 32 is known. It is also pointed out that the selector members shown are schematic in nature and are intended to exemplify one manner in which the invention can be carried out. Therefore, there has been no attempt at showing accurately dimensioned parts, it being recognized that, once the concept of the invention is conveyed, the specific details are well within the ability of anyone with ordinary skill in the art.

Additional raised and recessed zones 62 and 64 may be provided to accomplish multiple thermostat setting changes during the day. For example, it may be desirable to lower the temperature at night and raise it an hour or so before rising in the morning. Additionally, the temperature could be again lowered after everyone has departed from the home for the day and raised prior to their return.

It is noted that not all thermostats include a rotatable dial 14 such as the thermostat 12 shown in FIG. 1. Many thermostats include levers for adjusting the temperature setting. The embodiment of the thermostat timer shown in FIG. 4 provides for such thermostats. Elements of the alternate embodiment are identified with primed numbers which correspond to the numbers used to indicate corresponding elements in the embodiment shown in FIG. 1. As shown in FIG. 4, the thermostat 12' includes an adjuster which consists of a lever 86. In order to move the lever 86, the ouput wheel 38' of the thermostat timer 10' is provided with a lever receiving indentation or notch 88. It is contemplated that the output wheel 38' may be a replacement for the output wheel 38 shown in FIG. 1. Alternatively, the toothed output wheel 38 shown in FIG. 1 may include a portion which may be broken out or cut away to form the notch 88 if the thermostat timer is needed to control a lever operated thermostat timer 12'. The function and operation of the thermostat timer shown in FIG. 4 is otherwise identical to that shown in FIG. 1.

Another embodiment of the thermostat timer constructed in accordance with the instant invention is generally shown at 100 in FIG. 5. For purposes of illustration, the thermostsat timer 100 is also shown in operative engagement with a standard thermostat, generally shown at 102. As with most thermostats, the thermostat 102 includes a housing 104 which contains the standard electrical circuitry and temperature sensitive switch. The thermostat 102 also includes a temperature scale 106 and an indicating needle 108 for indicating the actual temperature of the surroundings. Additionally, the thermostat 102 includes a second temperature scale 110 and a needle 112 for indicating the temperature setting of the thermostat. The thermostat 102 also includes an externally accessible adjuster 114 which, in the case of a round thermostat, comprises a circular dial which is rotatable to change the temperature setting of the thermostat. Such adjustment, of course, varies the temperature at which the temperature responsive switch will close to activate the heating or air-conditioning system.

In this embodiment of the thermostat timer, movement of the adjuster 114 is effected by a small motor which is controlled by timing means. In other words, at selected times of the day, the thermostat timer 100 activates the motor to adjust the temperature setting of the adjuster 114. As will be described in greater detail herein, the motor can be driven in opposite directions so that the temperature setting of the thermostat can be alternately raised and lowered.

Figure 11:
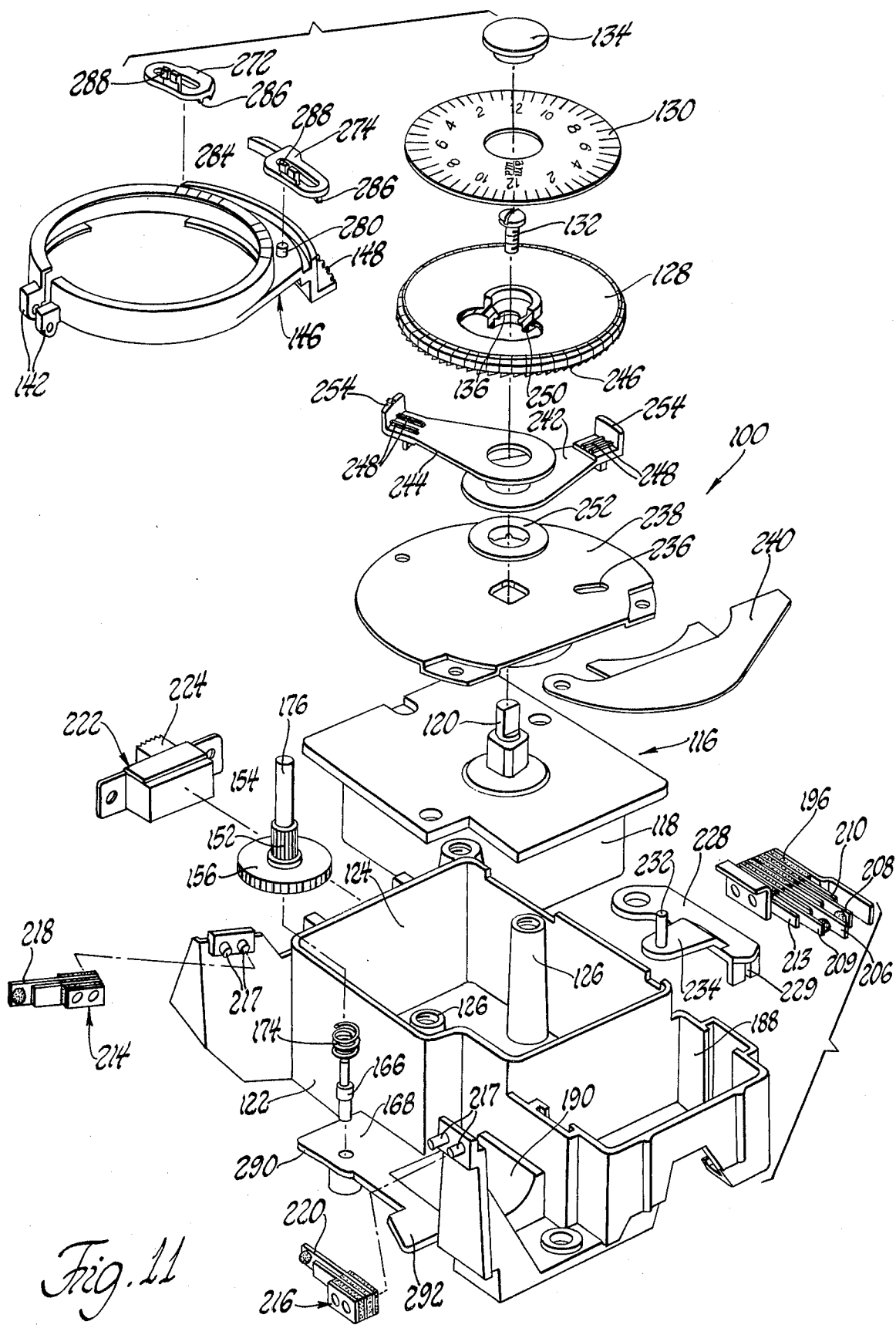
FIG. 11 is an exploded perspective view of the thermostat timer shown in FIG. 5.

More specifically, and referring to FIGS. 5 and 11, the thermostat timer includes timing means, generally indicated at 116. With particular reference to FIG. 11, the timing means 116 is contained within a suitable housing 118. Since the timing means is of a standard design, the specific details thereof are not shown. Suffice it to say, however, that the timing means includes a clockworks mechanism which drives an output shaft 120 so that it rotates once in a given period of time. As mentioned before, for household use, it is convenient to employ a 24 hour clockworks mechanism. In other words, the output shaft 120 rotates once in every 24 hour period.

The thermostat timer 100 includes a housing 122 for containing and/or supporting the various components of the thermostat timer 100. The housing 122 may be of any suitable material, such as, a die-cast plastic. As shown in FIG. 11, a cavity 124 is provided in the housing 122 for receiving the clockworks housing 118 of the timing means 116. Moreover suitable fastener-receiving means 126 are provided to fasten the timing means 116 to the housing 122.

A time indicator 128 comprising a rotating dial is mounted on the shaft 120 and rotates therewith. In the case of a 24 hour clockwork mechanism, the indicator dial 128 would, of course, make a complete revolution once every 24 hours. A suitable applique 130 is attached to the exposed face of the time indicator 128. The applique 130 includes indicia which indicates the 24 hours of the day. A suitable fastener 132 is provided for attaching the time indicator dial 128 to the shaft 120 of the timing means 116 and a cover 134 is provided for covering the fastener opening 136 for aesthetic purposes.

Referring to FIG. 5, the thermostat timer includes mechanically driven means, generally shown at 138, for engaging and moving the adjuster 114 of the thermostat 102. In this embodiment of the instant invention, the mechanically driven means 138 also includes an adapter member 140 which comprises a collar which surrounds and is adapted for attachment to the adjuster 114. For this purpose, the adapter member 140 may be made of plastic or a hard rubber material. The adapter member 140 is annular in shape, as shown in FIG. 11, and includes a pair of ears 142 which are pulled together by a fastener 144 to securely attach the adapter member 140 to the adjuster 114. As will become apparent, a primary function of the adapter 140 is to facilitate the transmission of motion to the adjuster 114.

The adapter member 140 includes a side extension generally indicated at 146 which is provided with an arcuate, toothed rack 148. The mechanically driven means 138 further includes motion transmitting means 150 for transmitting motion to the adapter member 140. Motion of the adapter member 140 will cause corresponding motion of the adjuster 114. The motion transmitting means 150 includes a pinion gear 152 which meshes with the gear teeth on the gear rack 148. The pinion gear 152 is supported by a shaft 154 and is non-rotatable with respect thereto. The shaft 154 supports a gear wheel 156 which, as will be described herein, is driven by a motor. At this point it is noted that the thermostat timer is very similar to the embodiments shown in FIGS. 1-4. The embodiments of the thermostat timer differ, however, in the means employed to drive the mechanically driven means.

More specifically, the thermostat timer shown in FIG. 5 includes drive means consisting of a motor 158 for driving the gear wheel 156. The output shaft 160 of the motor 158 rotatably drives a worm 162. The worm 162, in essence, comprises a small coil spring. This type of worm has been found to be very advantageous. As shown in FIG. 5, the teeth of the gear wheel 156 mesh with the convolutions of the spring-like worm 162. The use of a worm 162 of this design is advantageous since, due to its flexibility, precise location of the motor 158 with respect to the gear wheel 156 is not necessary. In other words, the spring-like worm 162 accommodates minor tolerance deviations.

As should be apparent, when the motor is driven, the worm 162 rotates the gear wheel 156 which in turn rotates the pinion 152 through the shaft 154. Rotation of the pinion 152 causes rotational motion of the adapter member 140 which is transmitted to the adjuster 114. Additionally, by changing the direction of rotation of the output shaft 160 and the worm 162, the adapter member 140 and adjuster 114 can be moved either in a clockwise or counterclockwise direction thereby permitting a change in the setting of the thermostat in opposite directions.

Figure 6:
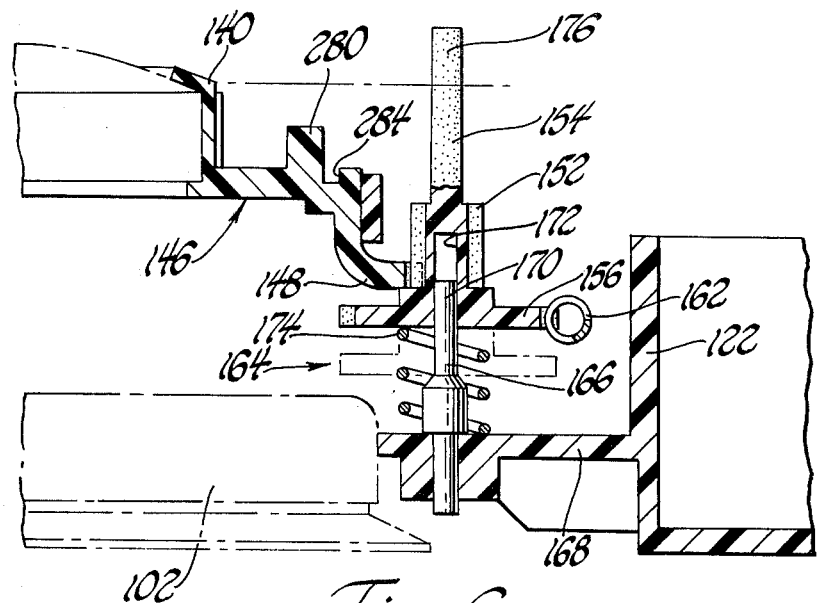
FIG. 6 is an enlarged, cross-sectional view taken generally along line 6—6 of FIG. 5.

On occasion, it may be necesssary to manually adjust the position of the adjuster 114. In such cases, the connection between the motor 158 and the adapter member 140 should be disabled. Accordingly, it is most desirable to permit disengagement of the gear wheel 156 from the worm 162. Hence, and referring to FIG. 6, the motion transmitting means includes support means, generally shown at 164, for supporting the shaft 154 to permit sufficient movement thereof to effect disengagement of the gear wheel 156 from the worm 162.

The support means includes a support post 166 which is supported by an extension 168 of the thermostat timer housing 122. The support post 166 includes an upper end 170 which is in telescopic relationship with the shaft 154. In other words, the upper end 170 of the support post 166 is received in a bore 172 in the shaft 154. Spring means comprising a coil spring member 174 operates between the housing extension 168 and the underside of the gear wheel 156 to urge the shaft 154 and gear wheel 156 toward a position in which the gear wheel 156 is in driving engagement with the worm 162. However, in order to disengage the gear wheel 156 from the worm 162, the post 154 may be pushed downwardly, as viewed in FIG. 6, against the force of the spring 174 to the position shown in phantom in FIG. 6. In the phantom position, gear wheel 156 no longer meshes with the worm 162. It is noted, however, that the pinion 152 remains meshed with the toothed rack 148. In this position, the adjuster 114 can be manually rotated with ease.

In order to manually rotate the adjuster 114, the shaft 154 is provided with a manually-grippable extension 176 for manually rotating the pinion gear 152. In other words, in order to manually adjust the adjuster 114, the shaft 154 is moved downwardly by depressing the manually grippable extension 176 until the gear wheel 156 is no longer in meshing engagement with the worm 162. The manually grippable extension 176 is then rotated causing rotation of the pinion 152 and hence the adapter member 140 and the adjuster 114. When the manually grippable extension 176 is released, the spring 174 moves the gear wheel 156 back into meshing engagement with the worm 162.

The thermostat timer also includes coupler means for coupling the mechanically driven means 138 to the timing means 116 for moving the mechanically driven means 138 at selected times to thereby move the adjuster 114 in order to change the setting of the adjuster. In the first described embodiment of the thermostat timer, the coupler means generally consisted of the movable shaft 52 which was capable of transmitting power from the clockwork mechanism to the mechanically driven means, i.e., the timing means. In the embodiment now being described, the coupler means generally consists of an electro-mechanical connection. More specifically, the coupler means includes the motor 158 mentioned above. The motor 158 may be of any desired design. In the embodiment shown, the motor 158 is a small DC motor which may be driven by a suitable power source, such as a battery 178. A suitable cavity 188 is provided in the thermostat timer housing 122 for receiving and supporting the battery. The thermostat timer housing 122 also includes a cradle portion 190 for receiving and retaining the motor 158. The motor 158 may be secured in the cradle 190 by any suitable means, such as, by using an adhesive tape.

The coupler means also includes electrical circuit means for controlling the operation of the motor. In short, the motor 158 is separated from its power sourced i.e., the battery 178, by an electrical circuit. As will be seen, whether or not power is supplied to the motor through the electrical circuit is determined by the timing means 116. For purposes of clarity, the wiring for the electrical circuit means is not shown in FIG. 5. However, the schematic of a suitable electrical circuit is shown generally at 192 in FIG. 7. The electrical circuit means 192 includes means responsive to the timing means 116 for operating the motor 158 at predetermined times. More specifically, such means includes an activating switch, generally indicated at 196, which is operated by the timing means 116. In the specific embodiment shown, the activating switch comprises a seven-bladed leaf switch 196 shown best in FIG. 11. However, it is to be noted that any switch and circuit arrangement which will activate the motor 158 in the manner intended would be suitable.

Figure 7:
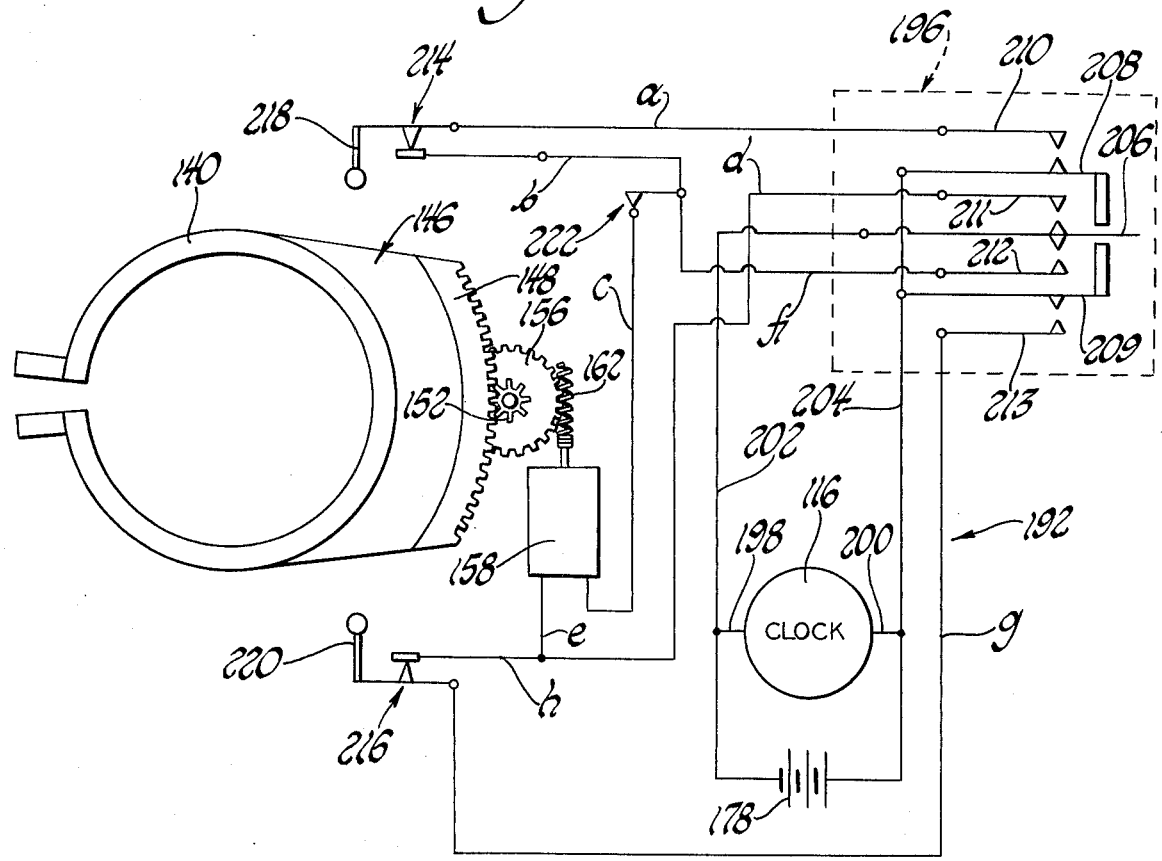
FIG. 7 is a schematic view of the electrical circuitry for the embodiment of the thermostat timer shown in FIG. 5.

The activating switch 196 of the electrical circuit means 192 must be capable of activating the motor 158 in response to the timing means 116. As will be described in greater detail herein, the timing means 116 includes one or more actuating members for operating the activating switch 196 at predetermined times. Since it is desirable that the thermostat timer 100 be capable of adjusting the adjuster 114 in opposite directions, that is, for raising and lowering the setting, a convenient manner of achieving this result is to selectively drive the motor 158 in opposite directions. Hence, the electrical circuit means 192 includes means for reversing the direction of operation of the motor 158 to permit a change in the setting of the adjuster 114 in opposite directions. More specifically, the electrical circuit means 192 includes a first operating circuit consisting of lines *a, b, c, d* and *e* to drive the motor 158 in one direction and a second operating circuit consisting of lines *f, c, g, h* and *e* to drive the motor 158 in an opposite direction. Accordingly, the activating switch 196 includes a normally open position (as shown in FIG. 7), a first closed position for completing the first operating circuit and a second closed position for completing the second operating circuit.

The timing means 116, designated by the legend "clock", includes leads 198 and 200 for connecting the timing means 116 to the battery 178. The timing means 116, therefore, continuously derives power from the battery 178. The negative and positive leads 202 and 204 respectively of the battery 178 are connected to the blades of the activating switch 196 as shown. More specifically, the negative lead 202 is connected to a central blade 206, while the positive lead 204 is connected to two slave blades 208 and 209, one being disposed on each side of the blade 206. Each side of the activating switch 196 is also provided with a pair of contact blades which are wired into the first and second circuits. In other words, the activating switch 196 includes two contact blades 210 and 211 for the first circuit and two contact blades 212 and 213 for the second circuit.

When the master blade 206 is moved against the slave blade 208, electrical contact is made between the master blade 206 and contact blade 211 and simultaneously electrical contact is made between the slave blade 208 and contact blade 210. Hence, a first operating circuit is completed to drive the motor 158 in one direction. When the master blade 206 is moved toward the slave blade 209, electrical contact is made between the master master blade 206 and contact blade 212 and also between slave blade 209 and contact blade 213. Hence, a second operating circuit is completed which reverses the polarity of the motor 158 to drive it in an opposite direction. Depending upon the direction in which the motor 158 is being driven, the adapter member 140 will be rotated in either a clockwise or a counterclockwise direction to raise or lower the setting of the thermostat.

The electrical circuit means 192 also includes shut-off switch means for terminating the operation of the motor 158 after a predetermined period of operation. As should be apparent, the duration of the operation of the motor determines the extent of setting change of the thermostat. The shut-off switch means includes a first shut-off switch generally shown at 214 for breaking the first operating circuit and a second shut-off switch generally shown at 216 for breaking the second operating circuit. Each of the shut-off switches includes an operating lever 218 and 220 respectively which are placed in the line of motion of the mechanically driven means, in this case, the adpater member 140, to open the normally closed shut-off switches. In other words, when the master blade 206 is moved against slave blade 209, the motor 158 is driven to cause the adapter member 140 to rotate in a clockwise direction. The adapter member 140 will rotate until it engages the lever 220 and opens shut-off switch 216. In short, the shut-off switch 220 limits the amount of angular rotation of the adapter member 140. Subsequently, the master blade 206 is moved toward slave blade 208 to complete the first operating circuit. This causes a reversal in the output of motor 158 and the adapter member 140 will rotate in a counterclockwise direction. Counterclockwise rotation of the adapter member 140 will cease when the adapter member 140 engages the lever 218 and opens the normally closed shut-off switch 214. As will be described in greater detail herein, adjustment means is provided for determining the duration of operation of the motor 158. A main shut-off switch generally indicated at 222 is also provided for preventing the operation of the motor 158 regardless of the position of the activating switch 196. In other words, the main shut-off switch 220, which is normally closed, is opened to prevent operation of the motor 158.

While the electrical circuit shown in FIG. 7 is adequate to accomplish the intended results, it is shown only by way of example. Alternative means may be employed to reverse the output of the motor 158 either electrically or mechanically. For example, a three lead, double wound motor could be used in place of the single wound motor 158. A double wound motor eliminates the need for a seven blade activating switch since a three pole switch could be used.

Referring to FIG. 5, the shut-off switch 214 and 216 are shown mounted to the thermostat timer housing 122. These switches may be mounted in any desired fashion. Conveniently, and as shown in FIG. 11, the housing 122 is provided with posts 217 which are received in holes in the body of the switch. These posts 217 are then staked over to hold the switches in place. As will be seen, the switches 214 and 216 are located so that the levers 218 and 220 can be engaged to open the switches by members carried by the adapter member 140.

The main shut-off switch 222 is also mounted on the housing 122. The main shut-off switch 222 includes a manually operable switch 224 for opening and closing the same.

The activating switch 196 is also supported by the housing 122 as shown in FIG. 5. A switch control member 228 is provided for opening and closing the activating switch 196. The switch control member 228 is supported for pivotal movement by the housing 122. For this purpose, a threaded fastener 230 is employed to attach the switch control member to the housing 122 for pivotal movement relating thereto. As shown in FIG. 11, the switch control member 228 includes a slotted opening 229 which is adapted to receive the end of the master blade 206 of the activating switch 196. Pivotal movement of the switch control member 228 to the right or left closes either the first or second operating circuit. The switch control member 228 includes an operating lever 232 which is carried by an arm 234 attached to the switch control member 228. Movement of the operating lever 232 moves the switch control member 234 to the right and left.

The operating lever 232 extends through a slot 236 in a mask plate 238. The mask plate 238 is designed to cover the top of the timing means and a peripheral area thereof as shown in FIG. 5. The mask plate 238 is employed basically for aesthetic purposes. It is noted at this time that after the thermostat timer is mounted adjacent a thermostat, a decorative housing is secured over both units to make an eye-pleasing installation. The outer perimeter of a decorative housing is indicated by the broken line 239 in FIG. 5. Such a housing or cover would be designed to include two circular openings through which time indicator dial 128 and the thermostat dial 114 are visible. The mask plate 238 is employed to hide from view internal working parts of the thermostat timer so that they cannot be seen through the opening. It is also noted that the mask plate 238 includes a portion 240 which is pivotally secured thereto to complete the mask. The portion 240 is pivoted to the major portion of the mask 238 so that it can be pivoted out of the way to gain access to the battery receiving cavity 188.

The operating lever 232 extends through the slot 236 in the mask 238 and into a space or cavity below the rotating time indicator 128. The time indicator 128 includes actuating members 242 and 244. These actuating members are designed to rotate with the time indicator dial 128 and to engage the operating lever 232 to throw the activating switch 196. The underside of the time indicator dial 128 includes peripherial serrations 246 and the upper sides of the actuating members include teeth 248 for seating in the serrations 246 to prevent inadvertent relative movement between the actuating member 242 and 244 and the time indicator dial 128.

The actuating members 242 and 244 are, however, adjustable with respect to the time indicator dial 128. When the time indicator dial 128 is synchronized with the time of day, the positions of the actuating members 242 and 244 on the time indicator dial 128 determines the times at which the setting of the thermostat will be adjusted. For this purpose the indicator dial 128 includes a cylindrical extension 250 on which are mounted the actuating members 242 and 244. These members are held on the sleeve 250 by a lock ring 252. This arrangement is shown most clearly in FIG. 8. When it is desirable to move the actuating members 242 and 244 with respect to the time indicator dial 128, the teeth 248 are disengaged from the serrations 246 by pushing downwardly on finger tabs 254 and rotating the actuating members about the cylindrical extension 250.

One of the adjustable actuating members is adapted to move the operating lever 232 in a first direction to move the activating switch 196 to the first closed position while the other adjustable actuating member 244 is adapted to move the operating lever 232 in the opposite direction to move the activating switch 196 to the second closed position. When not engaged by either of the actuating members, the operating lever 232 is in a neutral position which corresponds to the normally open position of the activating switch 196. To accomplish this function, each of the actuating members 242 and 244 includes a cam nenber 256 and 258 depending therefrom. Since the cam members 256 and 258 are spaced from the center of rotation of the time indicator dial 128 they are carried by the time indicator dial 128 over an endless circular path. As shown in FIG. 5, the operating lever 232 is positioned in the path of the cam member 256 and 258. Accordingly, when the cam members reach the position occupied by the operating lever 232 they will engage the operating lever 232 and move it in one of two directions.

The cam member 256 on the actuating member 242 defines a cam surface 260 which is designed to move the operating lever to the right as viewed in FIG. 5. Movement of the operating lever 232 to the right moves the switch control member 228 which in turn closes the activating switch 196 to complete the first operating circuit. When closed, the first operating circuit drives the motor 158 to move the adjuster in a counterclockwise direction. Similarly, the cam member 258 on the actuating member 234 defines a cam surface 262 which is designed to engage and move the operating lever 232 toward the left as viewed in FIG. 5. Movement of the operating lever 232 toward the left moves the switch contrl member 228 toward the left to close the activating switch 196 to complete the second operating circuit. When the second operating circuit is completed, the motor 158 is driven to move the adjuster 114 in a clockwise direction.

In use, the time indicator dial is synchronized with the hours of the day. The adjustable actuating member 242 and 244 are then located at positions corresponding to the times of the day when adjustment of the thermostat is required. Hence, as the indicator dial rotates, the adjuster 114 will be automatically raised and lowered at preselected hours of the day.

Figure 8:
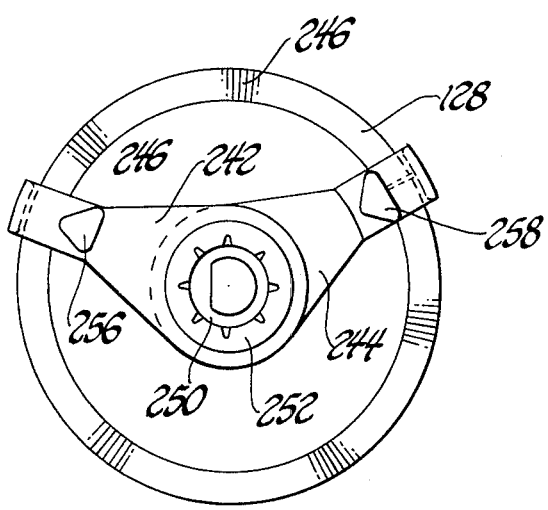
FIG. 8 is a bottom view of an element of the thermostat timer.
Figure 9:
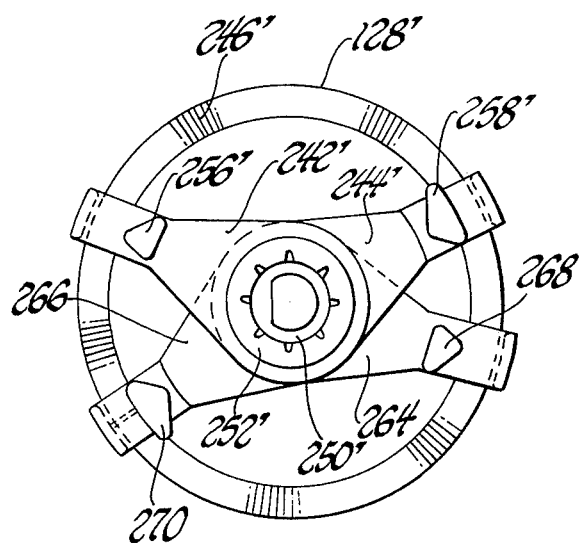
FIG. 9 is a bottom view of an alternate embodiment of an element similar to that shown in FIG. 8.

The time indicator dial 128 shown in FIGS. 5, 8 and 11 include two actuating members 242 and 244, one for raising the setting of the thermostat and one for lowering it. It is contemplated, however, that additional actuating members can be provided in pairs for effecting more than two adjustments per 24 hour period. An indicator dial for this purpose is shown in FIG. 9 wherein like parts corresponding to parts in FIG. 8 are identified as primed numbers. The difference between the time indicator dial 128' shown in FIG. 9 and the time indicator dial 128 shown in FIG. 8 is that it includes two additional actuating members 264 and 266. These actuating members also include cam members 268 and 270. In fact, actuating member 264 is basically identical to actuating member 242 and actuating member 266 is basically identical to actuating member 244. Again, one of the cam members 268 and 270 moves the operating lever 232 in one direction while the other cam member moves the operating lever 232 in the opposite direction. As shown in FIG. 9, the cam members are alternated so that an adjustment of the adjuster in one direction is followed by an adjustment in the opposite direction.

As noted in the description of the electrical circuit shown in FIG. 7, shut-off switches 214 and 216 are employed to limit the period of operation of the motor 158. The shut-off switches are opened by means of members which are carried by the mechanically driven means 138. More specifically, and referring to FIG. 5, two adjustable tabs 272 and 274 are carried by the extension 146 on the adapter member 140. Each of the tab members includes a cam surface 276 which is adapted to engage the lever of the shut-off switch closest to it. For example, if the activating switch 196 has been closed so that the motor 158 rotates the adapter member 140 and adjuster 114 in a counterclockwise direction the cam surface 276 of the tab member 272 will engage the lever 218 on the switch 214 thus moving the arms of the switch 214 apart thereby breaking electrical contact. This, of course, breaks the circuit thus terminating the operation of the motor 158 to cease the movement of the adapter member 140 and adjuster 114. The other tab member 274 operates in a similar fashion when the adapter member 140 is being rotated in the clockwise direction.

In order to vary the extent of setting change, the tab members 272 and 274 are adjustable. As should be apparent, the position of the tab members on the adapter member 140 will determine the extent to which the adapter member 140 will be permitted to rotate before the motor is turned off. This in turn determines the extent of adjustment in the setting of the adjuster 114. In order to permit adjustment, each of the tab members are provided with an elongated slot 278, a post 280 which extends through the slot 278 and a retainer ring 282 for retaining the tab member on the post while permitting sliding movement thereof. Movement of the tab members 272 and 274 is guided by a groove 284 in the extension 146. Each of the tab members are provided with guides 286 which extend downwardly into the groove 284. Additionally, each of the tab members includes finger grips 288 for moving the tab members 272 and 274. By moving the adjustable tabs 272 and 274 farther apart, the extent to which the thermostat setting will be changed is reduced. This is due to the fact that less angular rotation of the adapter members can take place before the adjustable tab will engage the shut-off switch. Conversely, moving the adjustable tabs 272 and 274 closer together results in a greater setting change since more angular rotation of the adapter member can take place before the adjustable tab engages the shut-off switch. For normal household use, the adjustable tabs may be positioned to cause a thermostat setting change of from 2° to 20° Farenheit as desired.

As should be apparent, this embodiment of the thermostat timer is also of the add-on variety. In other words, it is used with a pre-existing thermostat. In order to use this embodiment of the thermostat timer, the adapter member 140 is located on the adjuster 114 and made secure by the fastener 144 as shown in FIG. 5. Thereafter, the thermostat timer housing 122, which supports the timer 116, motor 158, switches, electrical circuitry, and motion transmitting means, is brought into position next to the thermostat so that the pinion gear 152 meshes with the gear rack 148 on the adapter member 140. To facilitate proper location of the thermostat timer housing 122 with respect to the thermostat, the housing 122 includes two locating tabs 290 and 292 which project from the extension 168. These locating tabs 290 and 292 include curved edges having a radius of curvature which corresponds to that of the housing 104 of the thermostat so that the tabs 290 and 292 fit snuggly against the housing. The length of the tabs 290 and 292 are predetermined so that the thermostat timer housing 122 will be properly spaced from the thermostat housing 104 when the tabs are brought into engagement with the thermostat housing 104.

After the thermostat timer housing 122 is properly located, it is secured to the wall which supports the thermostat by means of screws or the like. Thereafter, the adjustable tabs 272 and 274 are positioned so that a desired amount of adjustment will take place, the time indicator dial 128 is synchronized with the time of day, and the actuating members are located at positions corresponding to the times of day when adjustment is to take place. Thus arranged, the thermostat timer will automatically raise or lower the temperature setting of the thermostat a predetermined amount at predetermined times of the day.

As should be apparent from the foregoing description, as the time indicator dial 128 rotates, the actuating members 242 and 244 will engage the control lever 232 to throw the activating switch 196 first one way then the other. Consequently, the motor 158 will be driven to alternately raise and lower the temperature setting of the thermostat.

Figure 10:
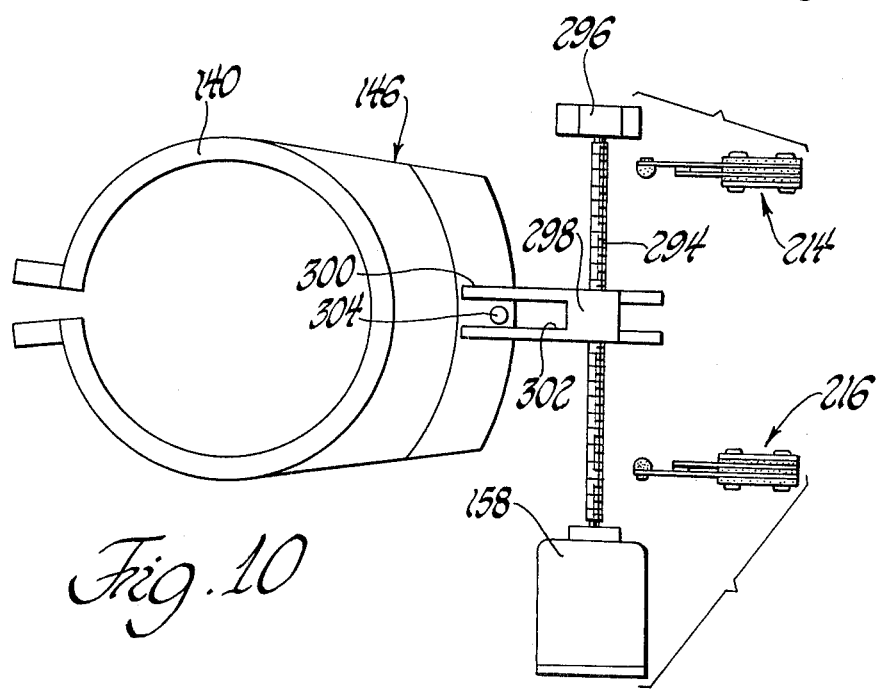
FIG. 10 is a generally schematic view of an alternate embodiment for a portion of the thermostat timer shown in FIG. 5.

As an alternative to the mechanically driven mechanism shown in FIG. 5, another embodiment is shown in FIG. 10. In the embodiment shown in FIG. 10, the motor 158 drives a threaded output shaft 294. The output shaft 294 is supported between the motor 158 and a journal box 296. A threaded carriage member 298 is supported on the threaded shaft 294. As should be apparent, rotation of the threaded shaft 294 causes linear movement of the threaded carriage member 298. The direction of rotation of the threaded shaft 294 determines whether the threaded carriage member 298 will move toward or away from the motor 158. The threaded carriage member 298 includes an extension 300 having a slot 302 formed therein. Located within the slot 302 is a post 304 which is supported by the extension 146 of the adapter member 140. As in the previous embodiment, shut-off switches 214 and 216 are mounted in the vicinity of the mechanically driven member 298. Suitable means (not shown) are provided for engaging the shut-off switches after the threaded carriage member 298 is moved a predetermined, desired distance. An advantage of the arrangement shown in FIG. 10 is that the shut-off switches can be relocated. Additionally, the use of the threaded carriage member 298 is easily adapted to adjusting a thermostat, or other control which includes a lever rather than a round dial. For example, the lever of the thermostat may be provided with a post similar to the post 304 so that it can be moved by the motor 158.

It is contemplated that the thermostat timer be either mounted adjacent a thermostat which has already been installed or that a thermostat timer and thermostat be mounted on a suitable backing plate which can be attached to a wall.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A device for automatically adjusting the setting of a control mechanism having an externally accessible adjuster for raising and lowering the setting of the control mechanism, said device comprising: mechanically driven means for engaging and moving the adjuster of the control mechanism, drive means for driving said mechanically driven means, electrical circuit means for controlling the operation of said drive means including multiple switch means for opening and closing said electrical circuit means, timing means for controlling one of said switch means for periodically closing said electrical circuit means at predetermined times for a limited time interval to activate said drive means, and switch control means for controlling another of said switch means movable simultaneously with said mechanically driven means for opening said electrical circuit means after a predetermined amount of adjusting movement.

2. A device as set forth in claim 1 wherein said timing means includes a switch control member for opening and closing one of said switch means.

3. A device as set forth in claim 2 wherein said timing means includes a time indicator which moves a predetermined distance during a given time span, said time indicator including at least one actuating member carried by said time indicator so that it moves over an endless path for engaging said switch control member at a location along said path.

4. A device as set forth in claim 2 wherein said timing means includes a rotating time indicator and an actuating member carried by said time indicator so that it moves over an endless circular path, said switch control member including an operating lever located along the path of said actuating member and engagable by said actuating member to move said control member.

5. A device as set forth in claim 4 wherein said actuating member includes mounting means for adjustably mounting the same to said time indicator to allow adjustment of said actuating member relative to said time indicator.

6. A device as set forth in claim 5 wherein said electrical circuit means includes means for reversing the direction of operation of said drive means to permit a change in the setting of the adjuster in opposite directions.

7. A device as set forth in claim 6 wherein said electrical circuit means includes a first operating circuit to drive said motor in one direction and a second operating circuit to drive said motor in the opposite direction and said activating switch includes a normally open position, a first closed position for completing said first operating circuit and a second closed position for completing said second operating circuit.

8. A device as set forth in claim 7 wherein said time indicator includes an adjustable actuating member for moving said switch control member in one direction to move said activating switch to said first closed position and an adjustable actuating member for moving said switch control member in an opposite direction to move said activating switch to said second closed position.

9. A device as set forth in claim 8 wherein said actuating members include a cam member defining a cam surface for engaging and moving said operating lever of said switch control member.

10. A device as set forth in claim 9 wherein said electrical circuit means includes a main shut-off switch for preventing the operation of said drive means.

11. A device as set forth in claim 1 wherein said mechanically driven means includes an adapter member separably connected to and movable with the adjuster of the control mechanism and motion transmitting means for transmitting the output of said motor to said adapter member.

12. A device as set forth in claim 11 wherein said adapter member includes gear teeth and said motion transmitting means includes a pinion gear drivable by said motor meshing with said gear teeth of said adapter member.

13. A device as set forth in claim 12 wherein said motion transmitting means includes a shaft for supporting said pinion gear and a gear wheel supported by said shaft normally in driving engagement with said motor.

14. A device as set forth in claim 13 wherein said motion transmitting means includes support means for supporting said shaft to permit movement thereof to effect disengagement of of said shaft wheel from said motor while maintaining meshing engagement between said pinion gear and said adapter member.

15. A device as set forth in claim 14 wherein said shaft includes a manually grippable extension for manually rotating said pinion gear.

16. A device as set forth in claim 15 wherein said support means includes a support post having an upper end in telescopic relationship with said shaft and spring means for urging said shaft and gear wheel toward a position in which said gear wheel is in driving engagement with said motor.

17. A device as set forth in claim 1 wherein said electrical circuit means includes a first operating circuit for driving said motor in one direction and a second operating circuit for driving said motor in the opposite direction and an activating switch responsive to said timing means for operating said drive means, said activating switch including a normally open position, a first closed position for completing said first operating circuit and a second closed position for completing said second operating circuit to thereby permit a change in the setting of the adjuster in opposite directions.

18. A device as set forth in claim 17 wherein said electrical circuit means includes shut-off switch means for terminating the operation of said drive means after a predetermined period of operation.

19. A device as set forth in claim 18 wherein said mechanically driven means includes shut-off switch control means for operating said shut-off means to terminate the operation of said drive means after a period of operation thereof.

20. A device as set forth in claim 19 including adjustment means for varying the period of operation of said drive means.

21. A device as set forth in claim 20 wherein said shut-off switch means includes a first shut-off switch for breaking said first operating circuit and a second shut-off switch for breaking said second operating circuit.

22. A device as set forth in claim 21 wherein said shut-off switch control means includes a pair of adjustable tab members carried by said adapter member.

23. A device as set forth in claim 1 wherein said drive means includes a motor and a threaded shaft rotatably driven by said motor, said mechanically driven means including a driven member in threaded engagement with said threaded shaft for linear movement along said threaded shaft in response to rotation thereof.

24. An automatic adjusting device adapted for mounting adjacent a pre-existing thermostat of the type which includes an externally accessible adjuster for changing the position of the adjuster to change the temperature setting of the thermostat, said device comprising:
mechanically driven means separably connectable to the adjuster of the thermostat,
drive means for driving said mechanically driven means alternately in first and second directions for changing the position of the adjuster to raise and lower the temperature setting of the thermostat,
electrical circuit means for controlling the operation of said drive means including switch means for opening and closing electrical circuit means, and
timing means cooperating with said switch means for periodically closing said electrical circuit means at predetermined times to activate said drive means.

25. A device as set forth in claim 24 including means for limiting the duration of operation of said drive means to thereby limit the extent of change in the position of the adjuster.

26. A device as set forth in claim 25 wherein said means for limiting the duration of operation of said drive means includes adjustable means for varying the duration of operation of said drive means to thereby vary the extent of change in the position of the adjuster.

27. A device as set forth in claim 25 wherein said means for limiting the duration of operation of said drive means includes limit switch means in said electrical circuit means for opening said electrical circuit means to deactivate said drive means.

28. A device as set forth in claim 27 includng limit switch control means movable simultaneously with said mechanically driven means for operating said limit switch means.

29. A device as set forth in claim 28 wherein said limit switch control means includes adjustable means for varying the duration of operation of said drive means to thereby vary the extent of change in the position of the adjuster.

30. A device as set forth in claim 29 wherein said drive means includes an electric motor and a source of electrical power.

31. A device as set forth in claim 24 including a switch control member for opening and closing said activating switch.

32. A device as set forth in claim 31 wherein said timing means includes a time indicator which moves a predetermined distance during a given time span, said time indicator including at least one actuating member carried by said time indicator so that it moves over an endless path for engaging said control member at a location along said path.

33. A device as set forth in claim 31 wherein said timing means includes a rotating time indicator and an actuating member carried by said time indicator so that it moves over an endless circular path, said switch control member including an operating lever located along the path of said actuating member and engagable by said actuating member to move said control member.

34. A device as set forth in claim 33 wherein said actuating member includes mounting means for adjustably mounting the same to said time indicator to allow adjustment of the position of said actuating member relative to said time indicator.

35. A device as set forth in claim 34 wherein said electrical circuit means includes means for reversing the direction of operation of said drive means to permit a change in the setting of the adjuster in opposite directions.

36. A device as set forth in claim 35 wherein said electrical circuit means includes a first operating circuit to drive said motor in one direction and a second operating circuit to drive said motor in the opposite direction and said activating switch includes a normally open position, a first closed position for completing said first operating circuit and a second closed position for completing said second operating circuit.

37. A device as set forth in claim 36 wherein said time indicator includes an adjustable actuating member for moving said control member in one direction to move said activating switch to said first closed position and an adjustable actuating member for moving said control member in an opposite direction to move said activating switch to said second closed position.

38. A device as set forth in claim 37 wherein said actuating members include a cam member defining a cam surface for engaging and moving said operating lever of said switch control member.

39. A device as set forth in claim 37 wherein said electrical circuit means includes shut-off switch means for terminating the operation of said motor after a predetermined period of operation.

40. A device as set forth in claim 39 wherein said shut-off switch means includes a first shut-off switch for breaking said first operating circuit and a second shut-off switch for breaking said second operating surface.

41. A device as set forth in claim 39 including adjustable means for adjusting the period of operation of said motor to control the amount of setting change of the adjuster.

42. A device as set forth in claim 41 wherein said electrical circuit means includes a main shut-off switch for preventing the operation of said motor.

43. A device as set forth in claim 24 wherein said mechanically driven means includes an adapter number separably connected to and movable with the adjuster of the control mechanism and motion transmitting means for transmitting the output of said drive means to said adapter member.

44. A device as set forth in claim 43 wherein said adapter member includes gear teeth and said motion transmitting means includes a pinion gear drivable by said motor meshing with said gear teeth of said adapter member.

45. A device as set forth in claim 44 wherein said motion transmitting means includes a shaft for supporting said pinion gear and a gear wheel supported by said shaft normally in driving engagement with said motor.

46. A device as set forth in claim 45 wherein said motion trasmitting means includes support means for supporting said shaft to permit movement thereof to effect disengagement of said gear wheel from said motor while maintaining meshing engagement between said pinion gear and said adapter member.

47. A device as set forth in claim 43 wherein said shaft includes a manually-grippable extension for manually rotating said pinion gear.

48. A device as set forth in claim 47 wherein said support means includes a support post having an upper end in telescopic relationship with said shaft and spring means for urging said shaft and gear wheel toward a position in which said gear wheel is in driving engagement with said motor.

* * * * *